May 1, 1951 W. H. DU BOIS 2,551,252
AUTOMATIC ADJUSTMENT FOR DISK BRAKES
Filed Feb. 15, 1946 2 Sheets—Sheet 1

INVENTOR.
WILLIAM H. DU BOIS
BY
T. J. Plante
ATTORNEY

May 1, 1951  W. H. DU BOIS  2,551,252
AUTOMATIC ADJUSTMENT FOR DISK BRAKES
Filed Feb. 15, 1946  2 Sheets-Sheet 2

INVENTOR.
WILLIAM H. DuBois
BY
T. J. Plante
ATTORNEY

Patented May 1, 1951

2,551,252

UNITED STATES PATENT OFFICE 2,551,252

AUTOMATIC ADJUSTMENT FOR DISK BRAKES

William H. Du Bois, South Bend, Ind., assignor to Bendix Aviation Corporation, South Bend, Ind., a corporation of Delaware Application February 15, 1946, Serial No. 647,781

11 Claims. (Cl. 188—72)

This invention relates to means for automatically adjusting disc brakes, and the general object is to provide functionally improved and structurally simplified mechanism of this type.

In an earlier application, Serial No. 646,247, filed February 8, 1946, I disclosed a disc brake automatic adjustment having certain advantages over prior suggestions. The present construction retains the features of the aforementioned application, and provides additional advantages which improve the reliability and consistency of the automatic adjustment.

The earlier application disclosed a frictional clamping device acting on an axially movable pin to control adjustment of the brake. Experience has shown that operation of this device may, on occasion, be adversely affected by excessive temperature changes. If the automatic adjustor of the earlier application is heated considerably, expansion or enlargement of the frictional clamping device tends to increase the frictional force, unless the housing of the clamping device also expands sufficiently to relieve the pressure. On the other hand, a lowering of temperature tends to reduce the dimensions of the clamping device and thereby reduce the frictional force.

An object of the present invention is to minimize or eliminate such variations in holding force due to temperature change, thus making operation of the device more consistent and reliable. This object I propose to accomplish by utilizing yieldable means to impose a holding force on the adjusting device.

The manner of attainment of the foregoing and other objects of the present invention will become apparent during the course of the following description, reference being had therein to the accompanying drawings, in which.

Figure 1:
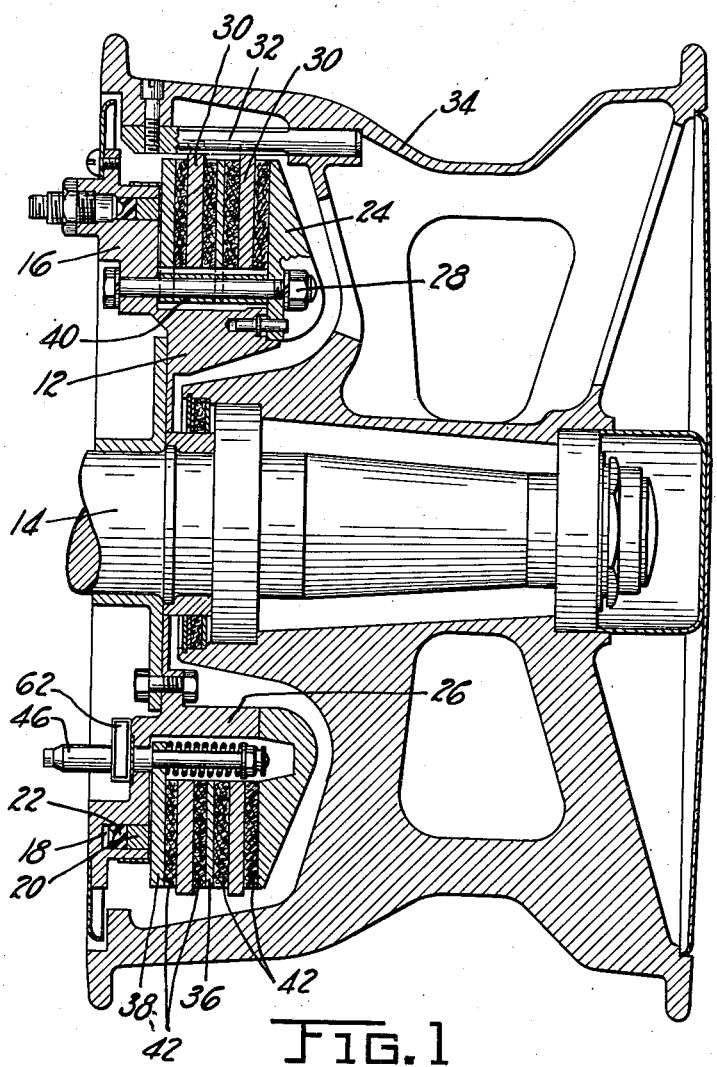
Figure 1 is a vertical section taken through a disc brake assembly which incorporates my invention.
Figure 3:
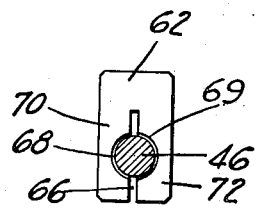
Figure 3 is an end view of the frictional clamping member of Figures 1 and 2, the view being taken as a section on the line 3—3 of Figure 2.
Figure 2:
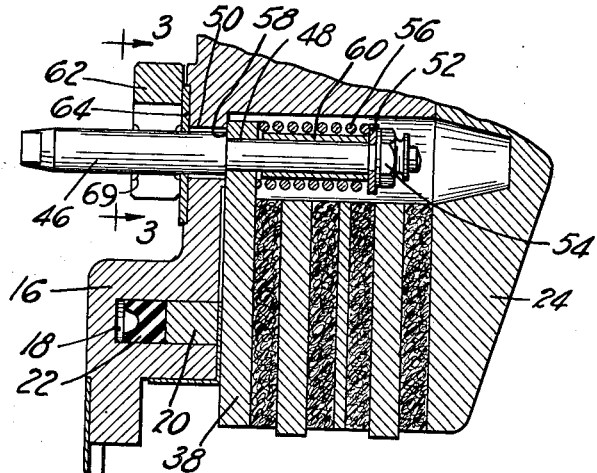
Figure 2 is a close-up of the automatic adjusting device of Figure 1.

Referring to the construction illustrated in Figures 1 to 3 inclusive, the disc brake structure with which the automatic adjustment is associated includes a carrier plate 12, which is a stationary member secured to the non-rotating axle 14. The member 12 has an outwardly extending flange 16, within which is provided an annular chamber 18 having an annular piston 20 and seal 22 located therein, the piston and seal being reciprocable in the chamber 18 under the opposing influences of fluid under pressure admitted to chamber 18 and the brake return springs. Located at the opposite side of the brake assembly is a backing plate or disc 24 which is secured in position against sleeve 26 of carrier 12 by means of a plurality of circumferentially spaced axially extending bolts 28.

One or more rotating brake discs 30 are arranged in the brake assembly between flange 16 and backing plate 24, the rotors 30 being driven by a plurality of circumferentially spaced axially extending driving keys 32 which are carried by the wheel 34. Because, in the present illustration, two rotor discs are provided, a stator disc 36 is located between the rotors and a pressure plate 38 is located between piston 20 and the other brake discs. The two rotor discs 30 are axially movable along the keys 32, and the stator disc 36 and pressure plate 38 are axially movable along the anchor sleeves 40, which are supported by the bolts 28. Suitable friction lining material 42 may be provided on each surface of stator disc 36 and on the inner surfaces of pressure plate 38 and backing plate 24, the lining being secured to the respective discs by suitable fastening means, such as the usual rivets.

It will, of course, be appreciated that development of frictional resistance which impedes the rotation of wheel 34 is accomplished by forcing fluid under pressure into chamber 18, thereby moving piston 20 toward the right to compress the brake discs between pressure plate 38 and backing plate 24. Suitable return springs are provided to move pressure plate 38 and piston 20 to released position after release of the fluid pressure in chamber 18.

As the brake lining wears, the distance through which piston 20 and pressure plate 38 must be moved to actuate the brake will gradually increase, unless suitable means are provided to adjust the brake. In the illustrated arrangement, the adjustment is accomplished automatically, and furthermore the adjustment mechanism is combined with the brake return springs in such a way as to provide certain advantages, which have been fully discussed in my earlier application, referred to above.

Because the automatic adjustment is associated with the return springs, I prefer to provide an automatic adjustment for every return spring required in the brake assembly. This will usually mean that six or more combined automatic adjustments and return springs will be included in the brake assembly, the several combined mechanisms being spaced equally about the circumference of the brake assembly. It will, of course, be appreciated that a number of automatic adjustments less than the total number of return springs may be used, and in such a case the advantages of the invention will nevertheless be obtained, at least in large measure. Furthermore, it will be appreciated that the principles of the invention are equally applicable regardless of the number of adjustors used, and therefore in the appended claims only one adjustor is recited.

Because the several adjustors which I prefer to provide are identical in construction, the following description of one such adjustor will suffice for all.

An axially extending pin 46 (see Figure 2 for an enlarged view of the construction being described) passes through an opening 48 in pressure plate 38 and through an opening 50 in carrier 12. The inner end of pin 46 carries a collar 52 which is held in position by means of a nut 54 threaded onto the end of the pin. A return spring 56 is compressed between the collar 52 and pressure plate 38, the force of the return spring acting against the pressure plate to normally hold said plate in released position, in which it abuts against a shoulder 58 provided on pin 46. A floating sleeve 60 is carried by pin 46 inside spring 56, the length of sleeve 60 being less than the distance (in released position) between collar 52 and pressure plate 38 by an amount equal to the desired running clearance of the brake. A frictional clamping device 62 is carried by the outwardly extending portion of pin 46, the edge of the frictional clamping device bearing against a steel plate 64 which in turn is supported against the side of flange 16 of the brake carrier. Thus inward or rightward movement of clamping member 62 is prevented by contact with a fixed part of the brake assembly.

Operation of the combined automatic adjustment and return spring is as follows. When pressure is exerted through piston 20 against pressure plate 38, said plate is caused to move toward the right. This movement compresses spring 56 and moves the brake discs axially into frictional engagement. If there has been an appreciable amount of brake wear, pressure plate 38 comes into contact with the end of sleeve 60 before the brake is fully applied, and acts through said sleeve and through collar 52 to urge pin 46 toward the right. The applying force exerted through pressure plate 38 is, of course, adequate to overcome the frictional force exerted by member 62 on pin 46, and consequently the pin moves inwardly with respect to the brake carrier. Upon release of the brake applying pressure, spring 56 returns pressure plate 38 to released position against shoulder 58 of pin 46 and, since shoulder 58 has been moved toward the right, the pressure plate remains in an advanced or adjusted position, the brake clearance being determined by the length of sleeve 60 as compared to the extended length of spring 56.

Since no structural element is provided to restrain outward or leftward movement of member 62, it may seem, at first blush, that such movement might occur. However, there is no force acting on member 62 tending to move it outwardly with respect to the brake carrier, while on the other hand the friction of sealing member 22, except when overcome by superior force, prevents movement of piston 20, pressure plate 38 and pin 46. Furthermore, there is certain to be a pressure head of fluid in the pressure system, which will assist in retaining the brake members in the adjusted position. Pin 46 and the member 62 thereon may obviously be moved to the left, or outwardly against the pressure of spring 56, a distance corresponding to the clearance between the sleeve 60 and the pressure plate 38.

In my earlier application, referred to above, the frictional clamping device used proved somewhat variable in the amount of frictional force due to expansion and contraction resulting from changes in temperature conditions. In order to obviate this variability or inconsistency in operation, I propose to provide a clamping member which develops a substantially constant frictional force tending to resist movement of pin 46 in the brake adjusting direction. It is important that measures be taken to accomplish this result because an excessive friction resisting inward movement of pin 46 causes a loss in brake efficiency, inasmuch as this frictional resistance must be overcome before the pressure stroke of plate 38 can be completed. On the other hand, if the frictional clamping force is too light, then pin 46 will be moved inwardly without previously compressing return spring 56 and, when the brake actuating pressure is released, there will be no available spring travel with which to obtain running clearance in the brake.

My improved frictional clamping device 62 is shown most clearly in Figure 3, wherein it is seen to be constituted by an inherently resilient (preferably metal) member which has a slit 66 extending inwardly from one end and a circular opening 68 provided about mid-way between the ends of the slit. The pin 46 extends through the opening 68 and the inherent resilience of the arms 70 and 72 develops a frictional clamping force against the pin. In a broad sense, the device 62 may be considered as a substantially U-shaped spring member which is so arranged that the body of pin 46 is clamped between the arms of the U. The edges of the opening 68 are preferably chamfered, as shown at 69, to avoid the possibility of having sharp edges which might dig into pin 46 and thereby adversely effect the consistency of the frictional force. Because the ideal condition of the frictional clamping device is a condition in which the frictional force is greater than the force of spring 56, but only slightly greater, it is desirable that the initial set of the spring arms of members 62 be so regulated as to develop the optimum frictional force. This may be accomplished by initially making the opening 68 slightly oversize, and thereafter, under pressure in a vise, squeezing the arms 70 and 72 together to cause the resilient clamping device to take a set in which a friction greater than the force of the return spring but not much greater will be obtained when member 62 is pressed in position upon pin 46.

It will be apparent that changes in temperature will have little or no effect upon the frictional force developed between members 62 and pin 46, primarily because of the inherent resiliency of the arms 70 and 72, which are capable of accommodating expansion and contraction of the pin without a serious change in the frictional resistance.

Figure 5:
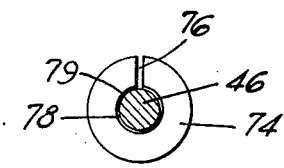
Figure 5 shows an end view of the frictional clamping device of Figure 4, the view being taken as a section on the line 5—5 of Figure 4.
Figure 4:
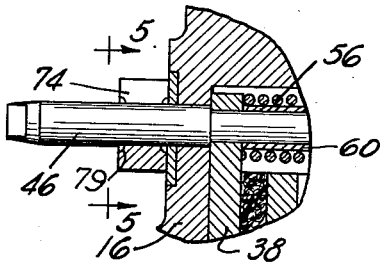
Figure 4 shows a modified version of the automatic adjustment of Figure 2.

Figures 4 and 5 illustrate a variation in the form of the resilient clamping member which provides frictional resistance to axial movement of pin 46. In these figures the clamping member is a C-shaped resilient member 74, having a slit 76 which intersects the central opening 78 of the C. The pin 46 extends through the opening 78 and is resiliently frictionally clamped in position by the incomplete annulus 74. The edges of openings 78 are preferably chamfered, as shown at 79, to avoid digging into pin 46.

Figure 6:
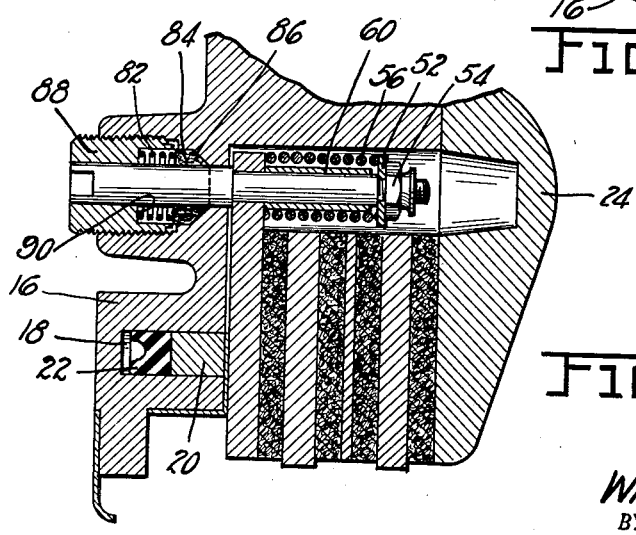
Figure 6 shows a further version of the automatic adjustment.

Figure 6 shows a modified version of my automatic adjusting device in which a compression coil spring 82 acts on a friction clamping device which is constituted by a split washer 84. The washer 84 has a conical surface 86 which engages a complementary conical surface formed in the body of the carrier flange 16. An annular plug 88 is screwed into the threaded opening provided in flange 16, in order to provide a shoulder 90, which engages one end of spring 82. The pressure of spring 82 against washer 84 causes the washer to exert a frictional clamping force on pin 46, part of the force of the spring being translated into clamping force because of the conical shape of the engaging surfaces at the right end of the washer. The frictional force is determined by the yieldable spring, and thus remains substantially constant regardless of expansion or contraction of the cooperating parts due to temperature variations.

Although certain particular embodiments of my invention have been described, it will be understood by those skilled in the art that the object of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. For use in a disc brake having an axially fixed member and an axially movable member which moves a distance partially determined by the amount of brake wear, automatically operating means for limiting the return movement of the movable member comprising an axially extending pin projecting through both the movable member and the fixed member, a resilient substantially U-shaped member which frictionally clamps the pin between the arms of the U, said resilient member being carried by the pin outside the fixed member and engaging the outer surface of the fixed member to prevent axial movement of the pin until the frictional clamping force is overcome, a collar on the inner end of the pin, a return spring compressed between the collar and the movable member to urge said member toward released position, a shoulder on the pin which limits the return movement of the movable member, and a sleeve carried by the pin between the collar and the movable member, said sleeve having a length less than the distance between the released position of the movable member and the collar by an amount equal to the predetermined running clearance of the brake, force exerted through said movable member first compressing said spring and thereafter acting through the sleeve and collar to move the pin inwardly against the frictional resistance of the aforementioned resilient member.

2. For use in a disc brake having an axially fixed member and an axially movable member which moves a distance partially determined by the amount of brake wear, automatically operating means for limiting the return movement of the movable member comprising a positioning member projecting through said movable member, and a resilient member split at one end to frictionally clamp itself on said positioning member, said resilient member being prevented from moving more than a predetermined distance with respect to the fixed member, thereby limiting movement of the positioning member except when the frictional clamping force is overcome.

3. For use in a disc brake having an axially fixed member and an axially movable member which moves a distance partially determined by the amount of brake wear, automatically operating means for limiting the return movement of the movable member comprising a positioning member projecting through said movable member, and a resilient clamping means associated with said positioning member and arranged to develop frictional force to resist relative movement of said positioning member, said resilient clamping means being prevented from moving more than a predetermined distance with respect to the fixed member, thereby limiting movement of the positioning member except when the frictional clamping force is overcome.

4. For use in a disc brake having an axially fixed member and an axially movable member which moves a distance partially determined by the amount of brake wear, automatically operating means for limiting the return movement of the movable member comprising an axially extending pin projecting through both the movable member and the fixed member, a resilient substantially C-shaped member which frictionally clamps the pin in the center of the C, said resilient member being carried by the pin outside the fixed member and engaging the outer surface of the fixed member to prevent axial movement of the pin until the frictional clamping force is overcome, a collar on the inner end of the pin, a return spring compressed between the collar and the movable member to urge said member toward released position, a shoulder on the pin which limits the return movement of the movable member, and a sleeve carried by the pin between the collar and the movable member, said sleeve having a length less than the distance between the released position of the movable member and the collar by an amount equal to the predetermined running clearance of the brake, force exerted through said movable member first compressing said spring and thereafter acting through the sleeve and collar to move the pin inwardly against the frictional resistance of the aforementioned resilient member.

5. For use in a disc brake having an axially fixed member and an axially movable member which moves a distance partially determined by the amount of brake wear, automatically operating means for limiting the return movement of the movable member comprising an axially extending pin projecting through both the movable member and the fixed member, a frictional clamping member carried by the pin and abutting against the fixed member to prevent movement of said clamping member with respect to said pin, said clamping member being substantially C-shaped to resiliently engage the pin, a collar on the inner end of the pin, a return spring compressed between the collar and the movable member to urge said member toward released position, and a shoulder on the pin intermediate its ends which limits the return movement of the movable member.

6. For use in a disc brake having an axially fixed member and an axially movable member which moves a distance partially determined by the amount of brake wear, automatically operating means for limiting the return movement of the movable member comprising a positioning member projecting through said movable member, and a substantially C-shaped resilient member frictionally clamped on said positioning member, said resilient member being prevented from moving more than a predetermined distance with respect to the fixed member, thereby limiting movement of the positioning member except when the frictional clamping force is overcome.

7. For use in a disc brake having an axially fixed member and an axially movable member which moves a distance partially determined by the amount of brake wear, automatically operating means for limiting the return movement of the movable member comprising an axially extending pin projecting through both the movable member and the fixed member, a split washer encircling said pin and having a tapered end surface, said fixed member having a complementary tapered surface engaging the tapered end surface of said washer and having a threaded portion, a retaining member having a threaded portion engaging the threaded portion of said fixed member, a spring compressed between the retaining member and the washer to exert a resilient force holding the washer in frictional engagement with the pin, said washer being associated with the pin outside the fixed member and engaging the outer surface of the fixed member to prevent axial movement of the pin until the frictional clamping force has been overcome, a collar on the inner end of the pin, a return spring compressed between the collar and the movable member to urge said member toward released position, a shoulder on the pin which limits the return movement of the movable member, and a sleeve carried by the pin between the collar and the movable member, said sleeve having a length less than the distance between the released position of the movable member and the collar by an amount equal to the predetermined running clearance of the brake, force exerted through said movable member first compressing said spring and thereafter acting through the sleeve and collar to move the pin inwardly against the frictional resistance of the aforementioned washer.

8. For use in a disc brake having an axially fixed member and an axially movable member which moves a distance partially determined by the amount of brake wear, automatically operating means for limiting the return movement of the movable member comprising a positioning member associated with said movable member, a split washer encircling said pin and having a tapered end surface which engages a complementary tapered surface, a retaining member, a spring compressed between the retaining member and the washer to exert a resilient force holding the washer in frictional engagement with the pin, said washer being prevented from moving more than a predetermined distance with respect to the fixed member, thereby limiting movement of the positioning member except when the frictional clamping force is overcome.

9. For use in a disc brake having an axially fixed member and an axially movable member which moves a distance partially determined by the amount of brake wear, automatically operating means for limiting the return movement of the movable member comprising an axially extending pin projecting through both the movable member and the fixed member, a resilient member which frictionally surrounds said pin and abuts said fixed member to restrict movement of said pin with respect to said fixed member, a shoulder on said pin between its ends which limits the return movement of said movable member, and means associated with said pin yieldably urging said movable member toward released position.

10. For use in a disc brake having an axially fixed member and an axially movable member which moves a distance partially determined by the amount of brake wear, automatically operating means for limiting the return movement of the movable member comprising an axially extending pin projecting through both the movable member and the fixed member, a resilient member which frictionally surrounds said pin and abuts said fixed member to restrict movement of said pin with respect to said fixed member, a shoulder on said pin which limits the return movement of said movable member, a sleeve floatingly received on the end of said pin which projects beyond the side of said movable member opposite from said fixed member, said sleeve having a length which is determined by the desired running clearance of the brake, and means associated with said pin yieldably urging said movable member toward released position.

11. For use in a disc brake having an axially fixed member and an axially movable member which moves a distance partially determined by the amount of brake wear, automatically operating means for limiting the return movement of the movable member comprising a positioning member projecting through both the movable member and the fixed member, and a resilient clamping means associated with said positioning member and arranged to develop frictional force to resist relative movement of said positioning member, said resilient clamping means being prevented from moving more than a predetermined distance with respect to the fixed member, thereby limiting movement of the positioning member except when the frictional clamping force is overcome.

WILLIAM H. DU BOIS.

REFERENCES CITED

The following references are of record in the file of this patent:

UNITED STATES PATENTS

| Number | Name | Date |
|---|---|---|
| 582,978 | Brown | May 18, 1897 |
| 1,527,981 | Kimball | Mar. 3, 1925 |
| 1,712,973 | Van Sickles | May 14, 1929 |
| 2,349,132 | Baird | May 16, 1944 |
| 2,363,436 | Pancoe | Nov. 21, 1944 |
| 2,392,970 | Bricker | Jan. 15, 1946 |